March 24, 1970 J. G. CADIOU 3,502,346
VEHICLE STEERING COLUMN SUPPORT
Filed Feb. 26, 1968 3 Sheets-Sheet 1
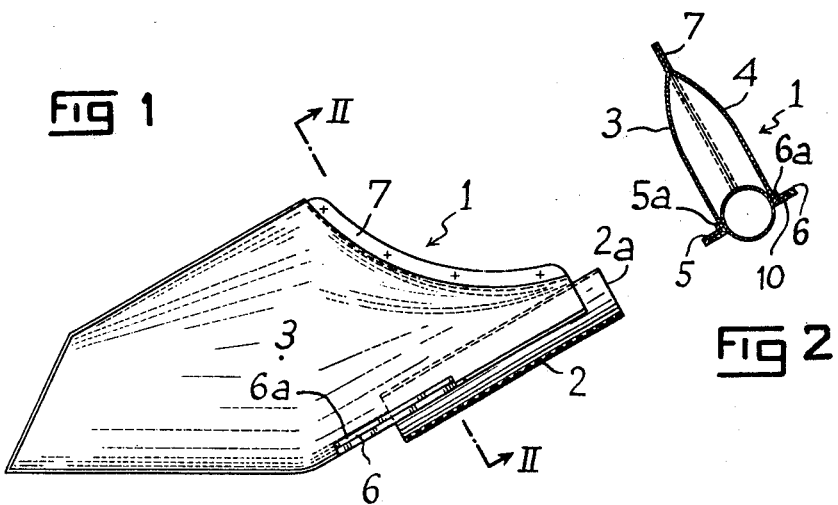
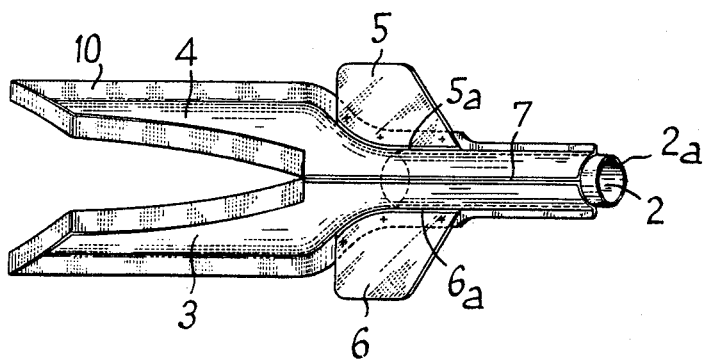

March 24, 1970  J. G. CADIOU  3,502,346
VEHICLE STEERING COLUMN SUPPORT
Filed Feb. 26, 1968  3 Sheets-Sheet 2

March 24, 1970 J. G. CADIOU 3,502,346
VEHICLE STEERING COLUMN SUPPORT

Filed Feb. 26, 1968 3 Sheets-Sheet 3

United States Patent Office 3,502,346
Patented Mar. 24, 1970

3,502,346
VEHICLE STEERING COLUMN SUPPORT
Jean G. Cadiou, Paris, France, assignor to Societe Anonyme Automobiles Citroen, Paris, France, a French society
Filed Feb. 26, 1968, Ser. No. 708,411
Claims priority, application France, May 16, 1967, 99,014
Int. Cl. B62d 1/16, 1/02
U.S. Cl. 280—87                     5 Claims

ABSTRACT OF THE DISCLOSURE

A vehicle steering column support having a hollow column guide-support and a fixing assembly for securing the guide support to the vehicle structure composed of first and second pairs of support members disposed in substantially perpendicular planes and joined together. The fixing assembly is non-detachably fixed both to the column support and to the vehicle structure.

---

This invention relates to vehicle steering column supports.

In present vehicles the steering column support generally includes a sleeve tube of limited length and a fixing element. This latter is detachably secured, usually by means of bolts, to the chassis of the vehicle.

This manner of mounting was adopted because it allows the alignment of the steering column with the steering box to be adjusted. Such adjustment is indispensable for straight steering columns, but is no longer necessary with articulated non-rectilinear steering columns, which are becoming more and more common.

However, this technique is still used, even though the adjustment of the position of the support is no longer really necessary, but the detachable mounting of the fixing element leaves a weakness in the vehicle structure at the point where this structure is broken to allow the steering column to pass. Other reinforcement pieces have been added to try to remedy this defect, but these have not been completely successful.

The object of the invention is to provide an improved support which eliminates the above disadvantages and increases the rigidity of the vehicle structure at the point where the steering column passes, without the aid of additional separate reinforcement pieces.

According to the invention, a steering column support comprises a hollow column support fixed to the vehicle structure by means of a fixing assembly which includes first support members preferably disposed in a substantially vertical plane, and two second support members disposed in a plane substantially perpendicular to the first named plane, these first and second support members being joined together so as to constitute an assembly which is fixed in non-detachable manner both to the hollow column support and to the vehicle structure.

In a preferred embodiment of the invention the two first support members are joined together along at least a part of their upper edge and are spaced from one another at their lower portion in a zone located on the extension of the column support.

Figure 4:
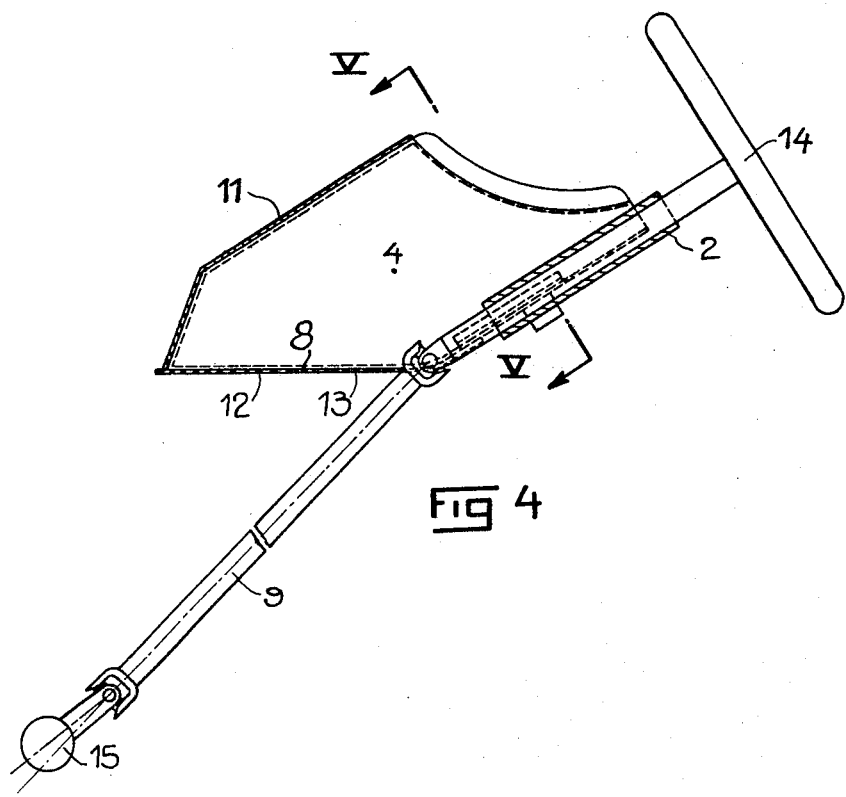
Figure 5:
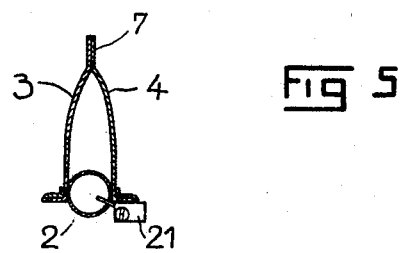
Figure 6:
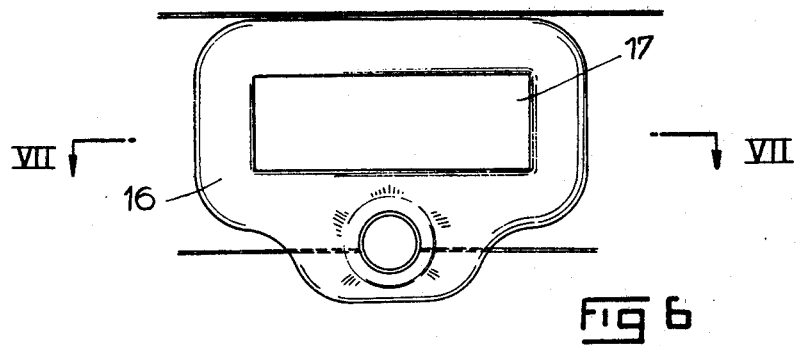
Figure 7:
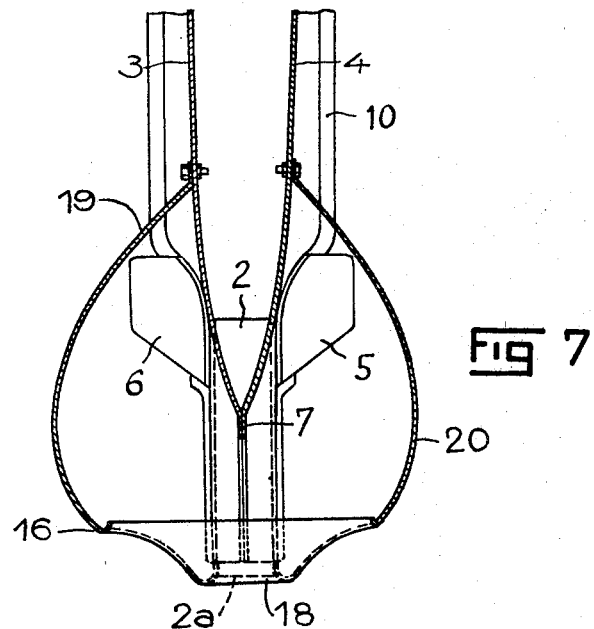

In order that the invention may be more fully understood, some embodiments in accordance therewith will now be described, by way of example, with reference to the accompanying drawings in which;

FIG. 1 is a side view of a steering column support of the invention;

FIG. 2 is a section along the line II—II of FIG. 1;
FIG. 3 is a plan view of the support of FIG. 1;
FIG. 4 is a view from the same side as FIG. 1 in section through a vertical axial plane of a complete non-rectilinear steering column mounted in the support;
FIG. 5 is a sectional view along the line V—V of FIG. 4;
FIG. 6 is a front view of the support of the invention supporting the frame of the instrument panel of the vehicle, and
FIG. 7 is a sectional view along the line VII—VII of FIG. 6.

The support of the invention shown by itself in FIGS. 1, 2 and 3 is designated by the general reference 1. As will be seen from these three figures, it comprises a downwardly inclined hollow column guide-support shown as a sleeve tube 2, two symmetrical first support members shown as bracket plates 3, 4 disposed substantially vertically and two second support members shown as brackets 5, 6 disposed in a plane perpendicular to the general plane of the two bracket plates.

The bracket plates 3 and 4 are disposed symmetrically with respect to the vertical plane passing through the axis of the sleeve tube 2. These bracket plates made from pressed sheet metal have the appearance of two half shells fixed by welding to the sleeve tube 2 along a part of two opposite generatrices of this tube. The latter thus has, at its end remote from the bracket plates, i.e. at its extreme rear portion, a free part 2a whose purpose will be made clear hereafter.

From the sleeve tube 2 as far as their upper extremity the bracket plates 3, 4 are joined together along a portion 7 of their upper edge as shown in the drawings.

By contrast, at their lower portion the bracket plates 3, 4 are separated from each other and define between them an unencumbered zone, as will be seen in FIG. 3, located on the extension of the tube 2. This zone is intended for the passage of the steering column 9 as shown in FIG. 4.

On their entire periphery, with the exception of the portion 7, the bracket plates 3, 4 have a turned over edge 10, more clearly seen in FIG. 3, which serves for welding to the vehicle structure. In the example described, this structure is in fact composed, as will be seen from FIG. 3, of the rearwardly inclined upper bulkhead 11 which extends across the vehicle beneath the windscreen and of the scuttle 12 which also extends transversely beneath the bulkhead. This scuttle has an opening 13 which corresponds to the opening 8 and serves for the passage of the steering column 9.

In addition to the two vertically disposed bracket plates there are provided two other brackets 5, 6 constituted by plates having upturned edges, being respectively 5a and 6a (see FIG. 2). The main portion of these brackets 5, 6 is in two separate planes, one of which is at the level of the upper face of the bent over edge of the corresponding part of the brackets 3, 4, and the other of which is at the level of the lower face of the same bent over edge. This detail is seen clearly in FIGS. 2 and 5.

The brackets 5, 6 will nevertheless be regarded as being disposed in substantially the same plane. This plane, passing through the axis of the sleeve tube 2, is perpendicular to the vertical plane which contains this same axis and in which the two bracket plates 3, 4 are joined at their edge 7.

The brackets 5, 6 rest on the scuttle 12 and are welded directly to the bracket plates 3, 4 at the place where the latter start to separate from each other as shown in FIG. 3.

The assembly of the sleeve tube and all the brackets constitutes a very rigid unit, the fixing of which by welding to the bulkhead 11 and the scuttle 12 to either side of the opening 13 of the latter, increases the rigidity of the basic structure of the vehicle without it being necessary to add other reinforcing parts.

After assembly of the articulated steering column 9 leading from the steering wheel 14 to the steering box 15 and passing through the sleeve tube 2, the general arrangement of FIG. 4 is obtained, in which the bracket plate 3 is assumed to be removed and the tube 2 is shown in vertical section.

Should a forward impact of the vehicle occur, the non-rectilinear steering column is less dangerous, for the driver, than a rectilinear one, since part of it can bend upon itself. Moreover, the support of the invention which has just been described imparts to that part of the vehicle structure located just in front of the driver a much greater resistance than that of any detachable type of assembly known up to now.

The support of the invention provides another advantage in relation to fixing the frame of the instrument panel in which are assembled the indicating devices needed by the driver. As will be seen in FIGS. 6 and 7, this frame can be made as a single pressed out part 16 having a central opening 17.

Beneath this latter is a second opening 18 which is circular and has a turned over edge, the diameter of which opening is slightly greater than that of the sleeve tube 2.

From the lateral edges, two plates 19, 20 extend rearwardly. The frame 16 has a rather complex general form curved towards the front in the region of the opening 18 and towards the rear on the sides and above the opening 17; this shape will be clearly seen in FIGS. 6 and 7.

In order to mount the frame 16 in place, the free end 2a of the tube 2 is introduced into the opening 18 and the plates 19 and 20 are fixed at their rear ends, by means of bolts for example, to the bracket plates 3 and 4. In this way, centering of the instrument panel with respect to the steering wheel is automatically effected without trial and error attempts or adjustment means.

Finally, the support of the invention also enables an anti-thief lock 21 to be easily incorporated. This latter can be fixed in known manner on the sleeve tube 2 but, as shown in FIG. 5, can also be secured in a novel manner in the vicinity of this tube on the brackets or the scuttle 12, an opening being formed in alignment in the wall of the tube 2. This arrangement avoids the inconvenience of a protruding element surrounding the tube 2. The engagement of the tongue of the lock is made with the same accuracy as in a conventional construction because the tube, the scuttle and the brackets are rigid one with the other.

Clearly, various modifications can be made to the form of the parts and to their relative positions.

What is claimed is:

1. In a vehicle, a steering column support comprising a hollow column guide support, a fixing assembly whereby the guide support is secured to the vehicle structure, the assembly including two first support members disposed in a substantially vertical plane and two second support members disposed in a plane substantially perpendicular to said vertical plane, the first and second support members being connected together to constitute the fixing assembly which is fixed in non-detachable manner both to the hollow column support and to the vehicle structure.

2. A support according to claim 1 wherein the two first support members are joined together along at least a portion of their upper edges and are separated from each other at their lower portions in a zone located on the extension of the column guide-support.

3. A support according to claim 1 wherein the fixing assembly is secured to the column guide-support along part of the length of the guide-support leaving a rear end portion of the guide-support free from obstruction.

4. A support according to claim 1 wherein the two first support members are welded at their upper portion to the bulkhead of the vehicle and at their lower portion to the scuttle, while the second support members are fixed both to the first support members and to the scuttle.

5. A support according to claim 1 comprising fixing means and guiding support means for an instrument panel frame adapted to receive the instruments of the vehicle, the fixing means and guiding support means being constituted respectively by the first support-members and the column guide-support.

References Cited

UNITED STATES PATENTS

| | | | |
|---|---|---|---|
| 2,535,744 | 12/1950 | Lyman | 180—90 X |
| 2,765,863 | 10/1956 | Barenyi | 296—28 X |
| 3,269,210 | 8/1966 | Steele | 180—90 X |
| 3,415,140 | 12/1968 | Bien et al. | 280—87 X |

FOREIGN PATENTS 179,982  10/1954  Austria.

KENNETH H. BETTS, Primary Examiner

U.S. Cl. X.R.

180—90, 114

CERTIFICATE OF CORRECTION

Patent No. 3,502,346    Dated March 24, 1970

Inventor(s) Jean G. CADIOU

It is certified that error appears in the above-identified patent and that said Letters Patent are hereby corrected as shown below:

It is certified that error appears in the above-identified Patent and that said Letters Patent are hereby corrected as shown below:

In the data concerning the claim to priority in the heading in column 1, line 7 the date "May 16,1967" should read -- March 16,1967 --.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents